Nov. 16, 1965

G. H. FREIER 3,218,078

AUTOMATIC RECORD CHANGER

Filed Nov. 28, 1962

INVENTOR.
Gerald H. Freier
BY
Brown, Jackson, Boettcher & Dienner
att'ys.

Nov. 16, 1965

G. H. FREIER

3,218,078

AUTOMATIC RECORD CHANGER

Filed Nov. 28, 1962

INVENTOR.
Gerald H. Freier
BY
Brown, Jackson, Boettcher & Dienner
Att'ys

United States Patent Office 3,218,078
Patented Nov. 16, 1965

3,218,078
AUTOMATIC RECORD CHANGER
Gerald H. Freier, Benton Harbor, Mich., assignor to V-M Corporation, Benton Harbor, Mich., a corporation of Michigan
Filed Nov. 28, 1962, Ser. No. 240,680
20 Claims. (Cl. 274—10)

The present invention relates to an automatic record changer of the type adapted to handle a stack of intermixed records of varying sizes such as 7 inch, 10 inch and 12 inch records, and to position a tone arm in a predetermined playing position in accordance with the size of the record to be reproduced.

More specifically, the invention relates to actuating mechanism for moving a tone arm through a predetermined cycle of operations during a record change cycle, and to selector mechanism for sensing the size of a record to be played and cooperating with the actuating mechanism to determine the corresponding set down position of the tone arm.

It is an object of the present invention to provide an improved tone arm actuating mechanism which is inexpensive to manufacture and yet particularly reliable and durable in operation.

Another object of the invention is to provide a tone arm actuating mechanism which is associated with the tone arm in such a manner that the mechanism will not be damaged if the tone arm is accidentally held or jammed while the mechanism is in operation.

A further object is to provide an improved selector mechanism which is unusually simple in its construction and yet highly effective in sensing the size of a new record which is dropped to the turntable and cooperating with the above-mentioned actuating mechanism to cause the latter to position the tone arm in playing position at the edge of the record.

In furtherance of the above objects, I provide a tone arm which is mounted on a vertical tone arm shaft for rotation therewith, and also mounted on said tone arm shaft in fixed relation thereto is a clutch plate, whereby rotation of the clutch plate about the vertical axis of the shaft will produce a corresponding rotation of the tone arm in order to swing the latter outwardly and inwardly relative to a record positioned on an associated turntable. I provide a clutch member which is mounted adjacent the underside of the clutch plate and which is adapted to be moved between an operative upper position wherein it is in driving engagement with the clutch plate and a lower inoperative position. The clutch member is connected with drive mechanism which is operative during a record change cycle to rotate the clutch first in one direction in order to swing the tone arm to an extreme outer position and then in the opposite direction to swing the tone arm inwardly to a predetermined position.

The clutch member of the present invention has secured thereto a clutch lever which is associated with a cam member whereby as the clutch member is rotated it will rotate the clutch lever which in turn will move along a corresponding cam surface to actuate the clutch between its operative and inoperative positions. Also associated with the clutch is a lift pin which cooperates with the tone arm, whereby as the clutch is raised toward its upper operative position, the lift pin engages the tone arm and raises it to an upper position prior to the tone arm being swung inwardly or outwardly by the clutch and the drive mechanism therefor. The lift pin is lowered with the clutch when the latter is disengaged so as to lower the tone arm to a position on the edge of a record to be played. The clutch lever is made flexible so that if the tone arm is accidentally held against vertical movement the lever will bend and thereby prevent damage to the mechanism.

In combination with the foregoing actuating mechanism, the clutch plate which rotates with the tone arm has a projecting tab formed thereon, and I provide a stepped locator plate which is pivoted on a horizontal axis at one end so as to be movable vertically to position a predetermined one of a plurality of stops or edge portions in the path of the projecting tab. In this manner, the locator interrupts the rotation of the clutch plate and thereby controls the movement of the tone arm as it swings inwardly to set down in playing position on the edge of the record.

In order to control the vertical position of the stepped locator plate in accordance with the size of a record to be played, there is provided a selector member which is rotatable about a vertical axis and has a horizontally extending arm portion with an upper sloping cam surface thereon adapted to be engaged by records of certain sizes as they are dropped to the turntable. The selector is thereby rotated a predetermined amount depending upon the diameter of the record which engages it.

The selector member is also provided with a plurality of steps which cooperate with a projecting tab on the stepped locator member, whereby when the selector is rotated due to engagement with a falling record, the steps on the selector will be moved relative to the projecting tab so as to permit the locator to rest on a different step and thereby move to a different vertical position depending upon the extent of rotation of the selector. In this manner, the stepped locator is positioned vertically in accordance with the size of a record which is dropped to the turntable. The locator is subsequently moved to an inoperative position after the tone arm has been set down in proper playing position and the stylus carried thereon has been picked up by a groove in the record to be played.

The foregoing and other advantages and uses of my invention will be apparent from the following description thereof, taken in conjunction with the accompanying drawings in which.

Figure 1:
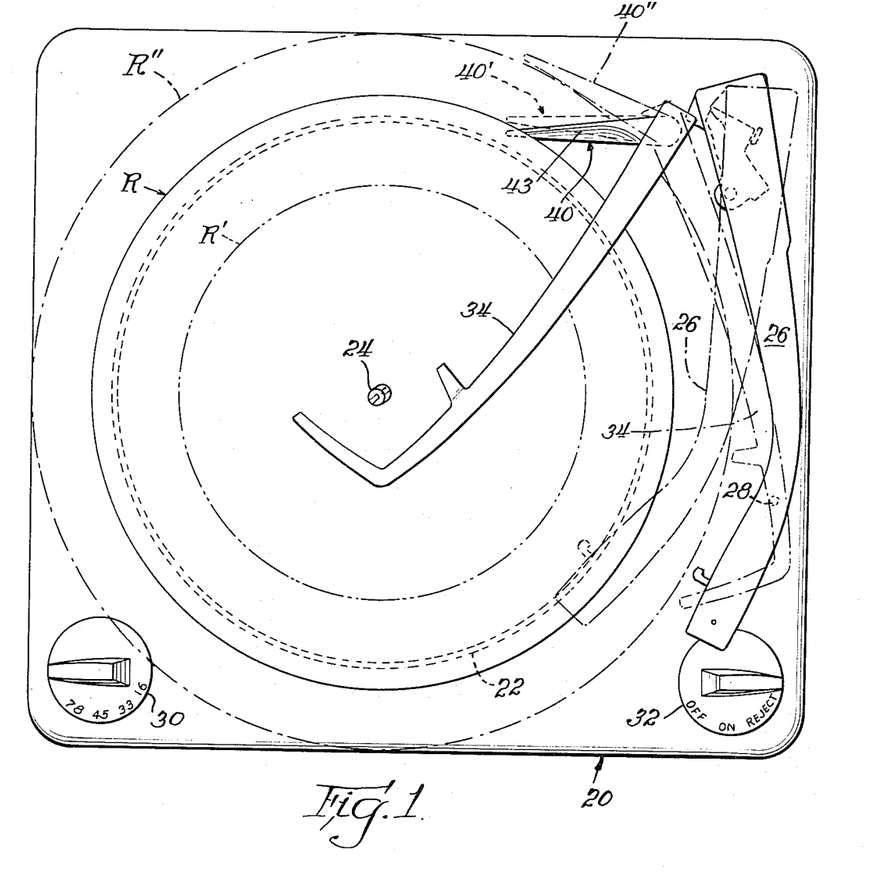
FIGURE 1 is a top plan view of a record changer embodying the improvements of the present invention, and a rotatable selector member is shown in solid lines in its normal inner position and in dotted lines in each of two alternative positions corresponding respectively to the position of the selector after being engaged by a 10 inch and a 12 inch record.

Referring now to the drawings, FIGURE 1 shows a record changer comprising a base plate 20, a turntable 22 mounted above the baseplate, a 10 inch or intermediate size record R mounted on the turntable, a conventional offset type spindle 24 projecting upwardly through the turntable, and a tone arm 26 pivotable about horizontal and vertical axes in the usual manner. The tone arm 26 is shown in solid lines in its inoperative position on a tone arm rest post 28, and in dotted lines in playing position as when set down at the edge of the 10 inch record R on the turntable.

The turntable 22 may be driven by conventional means (not shown) such as a motor-driven stepped drive shaft and a vertically shiftable idler wheel adapted to engage a downwardly extending peripheral flange on the turntable and one of the steps on the drive shaft to drive the turntable at a predetermined speed. A speed control knob is indicated at 30 and an on-off-reject control knob is shown at 32. FIGURE 1 further shows a record support arm 34 mounted at one end on a rod 35 (see FIGURE 13) which is rotatable and vertically slidable in a sleeve 36. A lower end portion 37 of the rod 35 is bent approximately horizontal and it rides in an L-shaped slot 38 in a bracket 39 whereby the support arm can be swung in and out between the positions shown respectively in solid and in dotted lines in FIGURE 1 only when the arm is manually raised to its uppermost position. It will be seen that with the record support arm 34 in its raised and radially outermost position, a stack of intermixed records of various sizes may be loaded on the spindle 24 so as to rest on the offset portion thereof, and thereafter the support arm may be moved to its radially inward position and lowered onto the stack of records to support them on the spindle.

Actuation of the spindle 24 will effect dropping of the lowermost record in the stack to the turntable 22, and a selector arm 40 (see FIGURES 1 and 13) is provided to sense the size of such a record as it falls to the turntable. The selector arm 40 has a sleeve portion 41 which is mounted on the sleeve 36, and it is provided with a peripheral flange 42 at its lower end which is adapted to surmount the base plate 20. The selector arm 40 is formed with an inclined cam surface 43 which is engageable by falling records of certain sizes to rotate the arm in a clockwise direction as shown in FIGURE 1. As previously stated, the record R of FIGURE 1 represents an intermediate size or 10 inch record, and there is further represented in dotted lines a small size or 7 inch record R' and a large size or 12 inch record R".

The normal position of the selector arm 40 is as shown in solid lines in FIGURE 1. When thus positioned, the arm will not be engaged when a 7 inch record R' is dropped to the turntable. However, it will be engaged by a 10 inch record R which will cause it to be rotated to the approximate position shown at 40', and it will be engaged by a 12 inch record R" and thereby rotated to the approximate position shown at 40". The position of the selector arm 40 is utilized to determine the extent of inward travel of the tone arm 26 as the latter is swung inwardly to be set down on a record to be played. In this manner, as will be explained in greater detail hereinafter, the tone arm is always set down in proper playing position at the edge of a record, whether the latter be a 7 inch, a 10 inch, or a 12 inch record.

Figure 7:
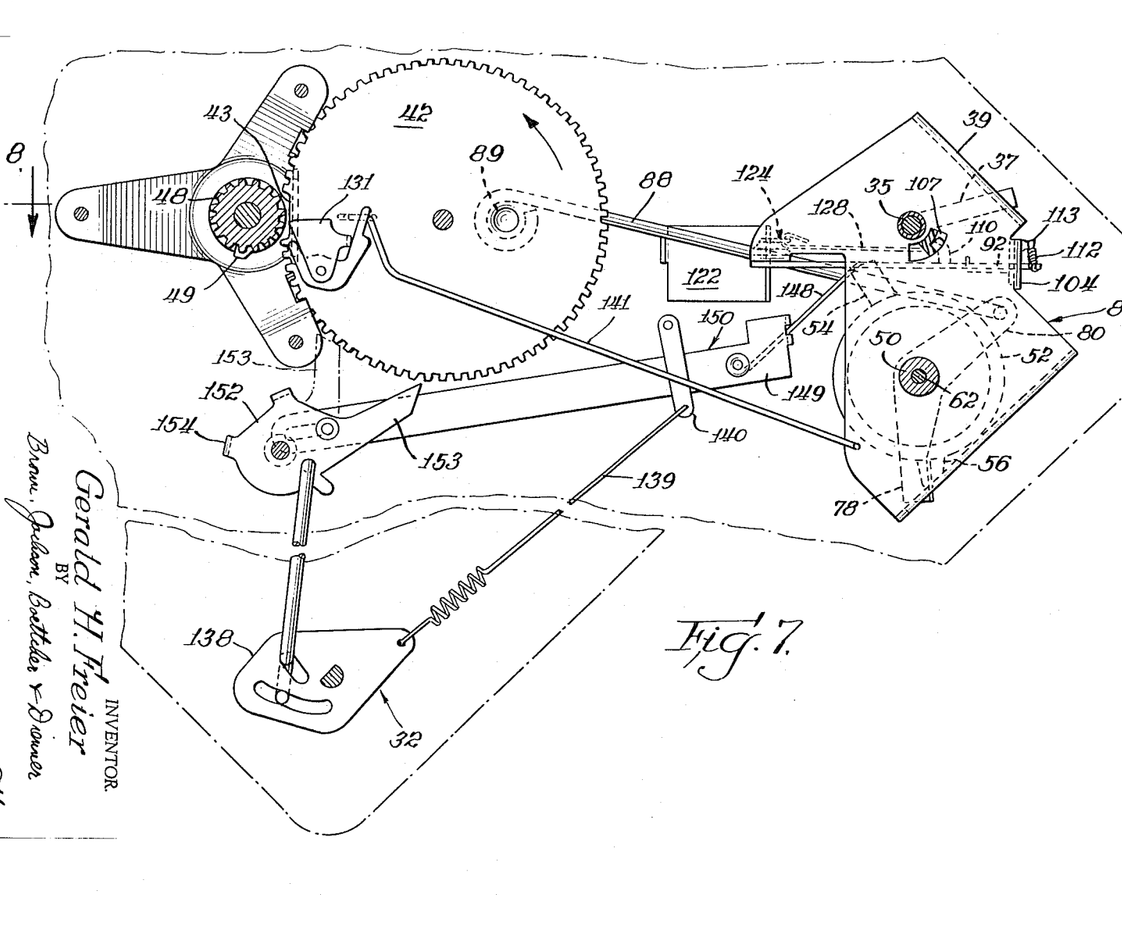
FIGURE 7 is a fragmentary top plan view, with a record changer base plate removed, showing the tone arm actuating mechanism and certain other related apparatus.
Figure 8:
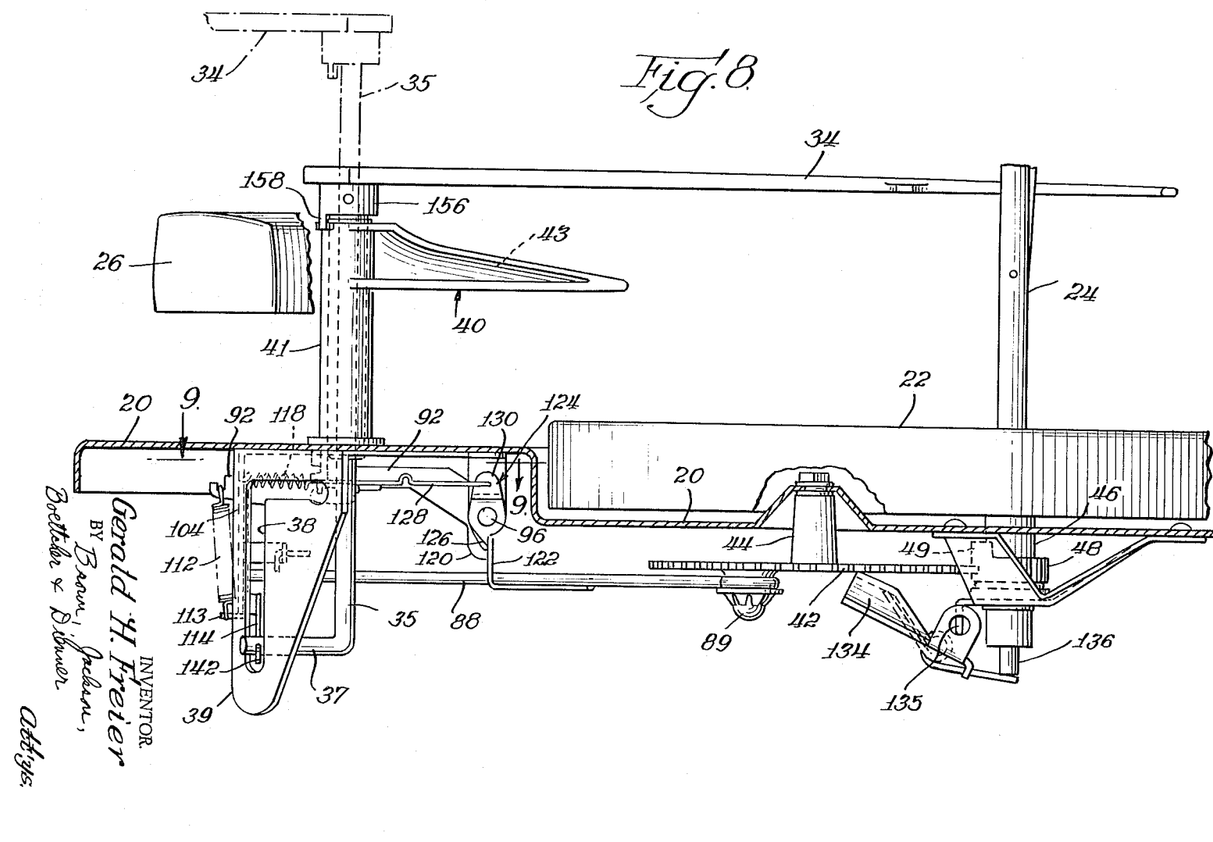
FIGURE 8 is a vertical section taken substantially along the line 8—8 of FIGURE 7.

FIGURES 7 and 8 show a relatively large diameter gear 42 secured to a hub portion 44 which projects downwardly from the underside of the record changer base plate 20. The hub is rotatably mounted to the baseplate and the gear 42 is thus rotatable about the the vertical axis of the hub. The turntable 22 has a downwardly projecting hub member 46 fixedly connected to the underside thereof, and the lower end of the hub 46 is provided with gear teeth so as to comprise a pinion 48 which is positioned to mesh with the large diameter gear 42 and thereby drive the same.

Since the turntable 22 is continuously rotated during the playing of a record, whereas it is desired to rotate the gear 42 only during a record change cycle, a few of the teeth are removed from the gear 42, as shown at 43 in FIGURE 7. Accordingly, when the relative position of the pinion 48 and gear 42 are as shown in FIGURE 7, rotation of the turntable will not effect rotation of the gear 42. However, upon advancement of the gear 42 a few degrees, it will be moved into operative engagement with the pinion 48 so as to be driven through one revolution, until it has again reached the inoperative position of FIGURE 7. In the embodiment being described, mechanism is provided for advancing the gear 42 into operative engagement with the pinion 48 once during each playing cycle, upon the completion of the playing of a record, and also whenever the knob 32 shown in FIGURE 1 is rotated to its "reject" position. Such mechanism will be described more fully hereinafter.

Figure 2:
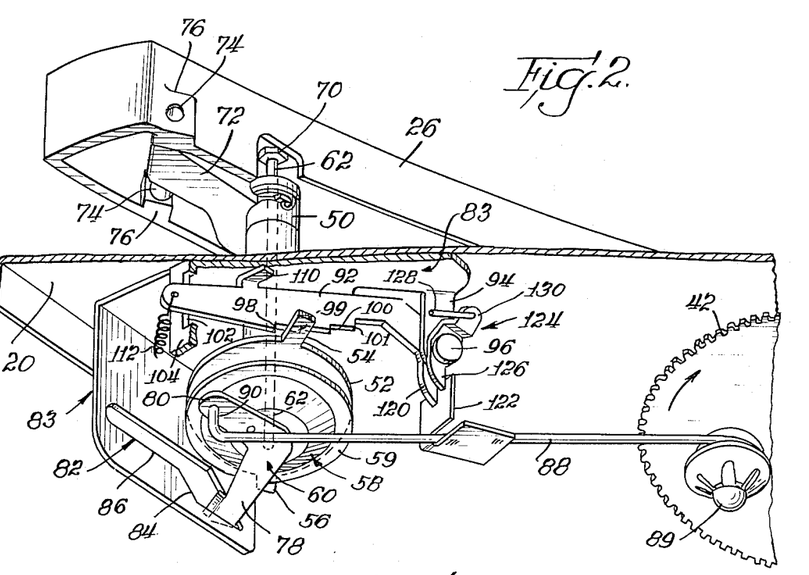
FIGURE 2 is a fragmentary perspective view illustrating in particular the tone arm actuating mechanism of the present invention and a stepped locator plate which cooperates therewith to interrupt the inward travel of the tone arm at a position corresponding to the size of a record to be played.
Figure 3:
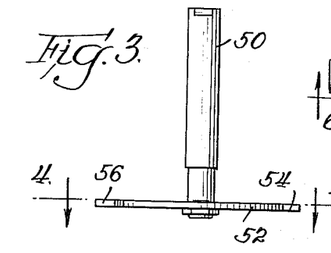
FIGURE 3 is a detail elevational view of a tone arm shaft and a clutch plate which rotates therewith.
Figure 4:
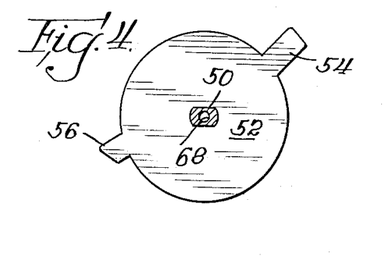
FIGURE 4 is a view of the clutch plate taken substantially along the line 4—4 of FIGURE 3.

Referring now to FIGURES 2–4, there is shown a tone arm shaft 50 which is adapted to rotate with the tone arm 26, whereby the extent of rotation of the shaft 50 will determine the extent to which the tone arm is swung inwardly and outwardly during a record change cycle. A clutch plate 52 is fixedly secured to the lower end of the tone arm shaft 50. As shown in FIGURES 3 and 4, the shaft 50 may have a rectangular end portion fitted within a similarly shaped aperture in the plate 52 to lock the two members together, whereby the radial position of the tone arm 26 can be controlled by controlling the rotational position of the clutch plate 52. It will be seen that the clutch plate 52 is provided with a pair of projecting tabs 54 and 56, which cooperate with stop means to be described hereinafter, to control the rotational position of the clutch plate.

Figures 5, 6:
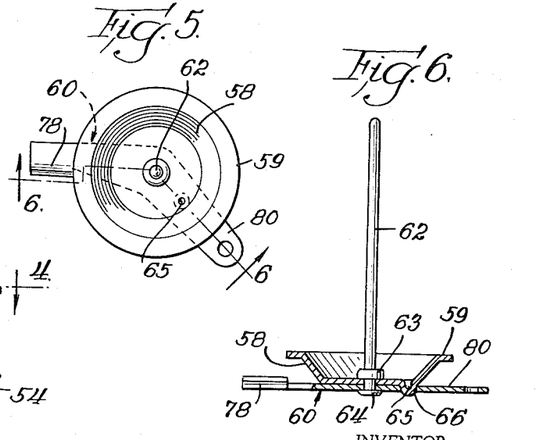
FIGURE 5 is a detail top plan view of a subassembly comprising a clutch member, a clutch lever, and a lift pin.
FIGURE 6 is a section taken substantially along the line 6—6 of FIGURE 5.

FIGURES 2, 5 and 6 show a clutch member 58 which is generally dish-shaped in its configuration and has a flat peripheral flange 59 at its upper end comprising a clutch surface adapted to cooperate with the clutch plate 52. A clutch lever 60 is connected to the underside of the clutch member 58 by means of a lift pin 62 which has a shoulder portion 63 bearing against the inside surface of the clutch base and a peened over lower end portion 64 which secures the clutch lever to the clutch. The clutch 58 is also provided with a small projection 65 which fits within an aperture 66 in the clutch lever so as to prevent relative rotation therebetween.

As shown in FIGURE 2, the subassembly of FIGURE 6 is mounted so as to dispose the clutch member 58 immediately beneath the clutch plate 52 in axial alignment therewith, with the lift pin 62 positioned so as to project upwardly through an aperture 68 in the clutch plate and through the tone arm shaft 50, whereby it projects beyond the upper end of the tone arm shaft and is thereby adapted to engage the head 70 of an adjustable screw or the like which is threaded into the tone arm housing. The tone arm 26 is mounted on a supporting arm 72 which is integral with the upper end of the tone arm shaft 50, and the arm 72 includes a pair of trunnion pins or the like 74 which are mounted in sockets 76 formed on the tone arm housing. In this manner, the tone arm 26 is pivotal about the horizontal axis of the pins 74, which axis is substantially to the left of the lift pin 62 and screw head 70 when viewed as in FIGURE 2. It will thus be understood that vertical movement of the tone arm 26 is controlled through vertical movement of the lift pin 62 which engages the bearing member or screw head 70 and moves the tone arm vertically about the axis of the pins 74.

The clutch lever 60 comprises a pair of arms 78 and 80, and the end of the arm 78 rides in a cam slot 82 formed in a bracket member 83 which is fixedly secured to the underside of the baseplate 20. The cam slot 82 has an inclined portion 84 which leads from a lower level 85 to an upper level 86. As shown in FIGURE 2, the arm 78 is disposed at the lower level 85 of the slot, and in this position the clutch 58 is disengaged from the clutch plate 52, and the lift pin 62 is in its lower position so as to position the tone arm accordingly. However, it will be noted that when the clutch lever 60 and clutch 58 are rotated in a clockwise direction, as viewed from below, the arm 78 will ride up the inclined portion 84 causing the clutch 58 to operativley engage the clutch plate 52. Consequently, upon further rotation of the clutch 58, the clutch plate 52 and the tone arm 26 will be rotated therewith. In addition, when the clutch 58 is thus moved upwardly, the lift pin 62 will be raised a similar amount so as to lift the tone arm to its elevated position. It will thus be seen that the tone arm 26 will always be raised to its elevated position before it is swung inwardly or outwardly by rotation of the clutch 58.

Actuation of the clutch 58 is effected by a pull link or rod 88, one end of which is wrapped around a projecting pin 89 on the gear 42, and the other end of which is bent vertically as at 90 so as to project into an aperture provided therefor in the arm 80, whereby the link 88 comprises a positive drive connection between the gear 42 and the clutch lever 60. The projecting pin 89 which anchors the link 88 to the gear 42 is eccentrically positioned on the gear in such a manner that as the latter rotates through one revolution the link is first moved in one direction and then in the opposite direction. Such reciprocating movement of the link 88 will cause the clutch 58 and clutch lever 60 to rotate first in a clockwise direction (when viewed from below in FIGURE 2) so as to swing the tone arm 26 radially outwardly to permit a record to be dropped to the turntable 22, and then in a counterclockwise direction to swing the tone arm 26 inwardly to set down on the edge of the record. As previously described, the gear 42 is rotated through one revolution during each record change cycle.

It is important to note that the clutch lever arm 78 is made of a relatively thin strip of metal or other suitable flexible material so that if the tone arm is held or jammed in some manner so as to be prevented from being raised to its uppermost position, the arm 78 will bend as the end thereof rides up the inclined portion 84 of the cam slot 82 so as to avoid any damage to the mechanism associated therewith. The arm 78 is of course sufficiently rigid to effect raising of the tone arm and engagement of the clutch 58 under normal operating conditions.

The mechanism for controlling the extent of movement of the tone arm 26 as it swings inwardly and outwardly will now be described. The radially outward travel of the tone arm is limited by means of the tab 56 which is formed on the clutch plate 52. When the tone arm 26 is swung outwardly to or slightly beyond the approximate position shown in solid lines in FIGURE 1, wherein the tone arm is over the rest post 28, the tab 56 on the clutch plate 52 will engage the wall of the bracket 83 (see FIGURE 7) so as to prevent further outward travel of the tone arm. Upon further rotation of the clutch member 58 in the clockwise direction (when viewed from below) the clutch will slip and the clutch member 58 will rotate relative to the clutch plate 52.

In order to limit the inward travel of the tone arm 26 as it is swung inwardly to set down on the edge of a record to be played, there is provided a stepped locator member 92 (see FIGURES 2, 9, 11 and 13) which is pivotally mounted at its radially inner end to a downwardly bent arm 94 which is integral with the mounting bracket 83. A horizontally disposed pin 96 is passed through the arm 94 and locator member 92 whereby the locator is adapted to pivot vertically about the axis of the pin.

As best shown in FIGURE 2, the tab 54 on the clutch plate 52 is adapted to cooperate with a plurality of stops or edge portions formed on the underside of the locator 92 in order to control the set down position of the tone arm 26. Thus, the underside of the locator 92 is stepped so as to provide edge portions 98, 99, 100 and 101. Depending upon the vertical or pivotal position of the locator, the tab 54 will engage one of the edge portions which will serve as a stop to prevent further rotation of the clutch plate 52 in the counterclockwise direction (as viewed from below), and thereby prevent further inward travel of the tone arm 26.

The free end of the locator 92 is disposed within a vertical slot 102 provided in a downwardly extending supporting plate 104 which is an integral part of the bracket 83, and thus the vertical travel of the locator is limited by the length of the slot 102. When the end of the locator 92 is engaged against the bottom of the slot 102, so as to be in its lowermost position, the edge portion 101 will be positioned to engage the tab 54, at which time the tone arm 26 will be approximately in its extreme outer position over the tone arm rest post 28 as shown in solid lines in FIGURE 1. As will be explained more fully hereinafter, the locator 92 is normally moved to its lowermost position only after the last record has been played and the record changer is to be automatically shut off.

When the locator 92 is positioned in its next-to-lowermost position, the edge portion 100 will be adapted to engage the tab 54, at which time the tone arm 26 will be positioned to set down on the edge of a 12 inch record. Similarly, when the locator is moved to its next higher position, the edge portion 99 thereon will be in the plane of the tab 54 so as to intercept the latter and thereby interrupt the inward travel of the tone arm when it is in the approximate position shown in dotted lines in FIGURE 1, whereby it will be set down on the edge of a 10 inch record. When the locator is moved to its uppermost position it will be inoperative since all of the edge portions thereon will be disposed above the plane of the tab 54. However, if the locator 92 is moved to its next-to-uppermost position as shown in FIGURE 2, the rotation of the clutch plate 52 will be interrupted when the tab 54 thereon engages the edge portion 98, at which time the tone arm will be positioned over the edge of a 7 inch record on the turntable.

Figure 9:
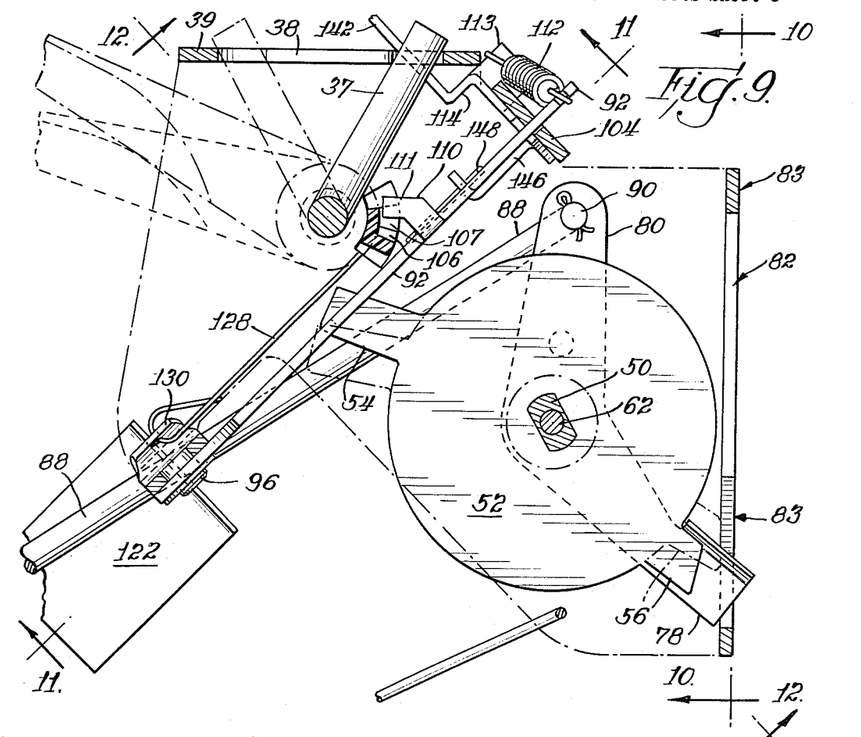
FIGURE 9 is an enlarged fragmentary sectional view taken substantially along the line 9—9 of FIGURE 8.
Figure 10:
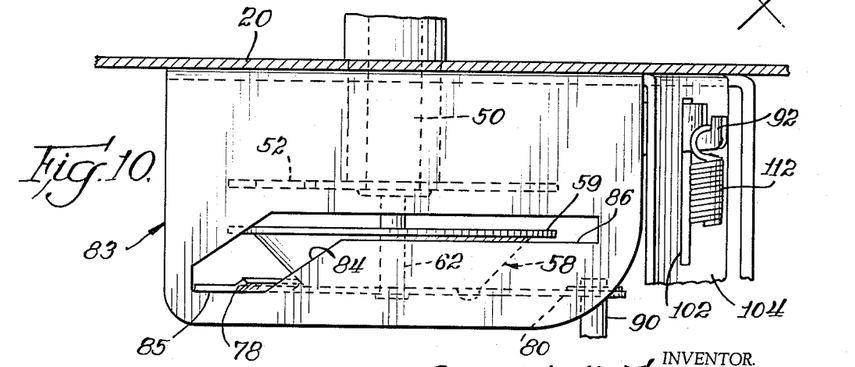
FIGURE 10 is a fragmentary elevational view, partly in section, taken substantially along the line 10—10 of FIGURE 9.
Figures 11, 12:
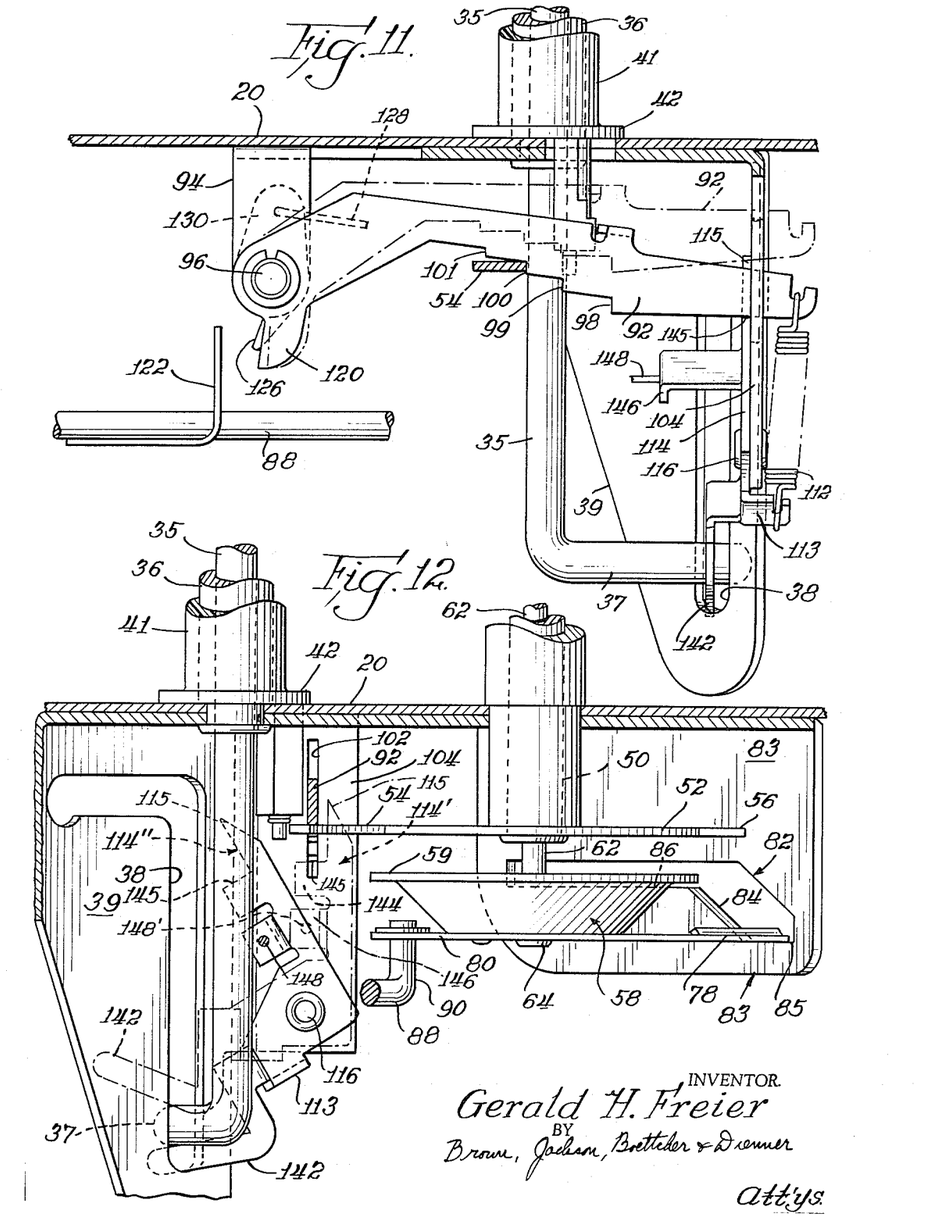
FIGURE 11 is a section taken substantially along the line 11—11 of FIGURE 9.
FIGURE 12 is a sectional view taken substantially along the line 12—12 of FIGURE 9.

The mechanism for controlling the vertical position of the locator 92 in accordance with the size of a record dropped to the turntable will now be described, and for this purpose reference is made to FIGURES 9, 12 and 13. The rotatable selector member 40, which as described hereinabove is engaged and rotated when a 10 inch or a 12 inch record is dropped to the turntable, is provided at the lower end of the sleeve portion 41 with a plurality of steps or ledges 106 and 107 which cooperate with a horizontally projecting tab 110 which is formed integral with the locator 92. In this manner, the vertical position of the locator 92 is controlled in accordance with the rotational position of the selector 40. It will be noted that the tab 110 has an end portion 111 which extends approximately parallel to the steps 106 and 107 so as to be adapted to rest upon one of the steps depending upon the position of the selector. When the selector 40 is rotated so as to permit the tab 110 to fall from the lower step 107, the locator 92 will drop to a third operative position wherein it is supported by an edge portion 145 on a tab 144 which is formed on a lever 114 (as best shown in FIGURES 11 and 12).

The locator 92 is biased downwardly by a tension spring 112 (best shown in FIGURES 11 and 13) which has one end secured to the free end of the locator 92 and its other end connected to a tab 113 on the lever 114, the latter being pivotally secured to the downwardly bent plate portion 104 of the supporting bracket 83 by a rivet or the like 116. If the locator 92 is raised to its uppermost position and the selector 40 rotated to its normal inner position as shown in solid lines in FIGURE 1, the locator will move downwardly until the tab end portion 111 thereon is supported on the upper step 106 of the selector. The locator will thus be supported in its next-to-uppermost position as shown in FIGURE 2, and the edge portion 98 on the locator will interrupt inward travel of the tone arm 26 to cause the latter to set down on the edge of a 7 inch record. The selector 40 is normally biased to its inner position by a tension spring 118 (see FIGURE 8) which has one end connected to the supporting bracket 83 and its other end secured to the lower end of the selector eccentrically of the vertical pivot axis thereof.

It will be understood from the foregoing that the selector mechanism is normally positioned to interrupt inward travel of the tone arm 26 at the edge of a 7 inch record, and as previously described, a 7 inch record will not engage the selector arm 40 when it falls to the turntable. However, when a 10 inch record falls to the turntable it will engage the cam surface 43 on the selector arm 40 and rotate the latter to the position shown in dotted lines at 40' in FIGURE 1, whereupon the movement of the stepped portion at the lower end of the selector will permit the locator 92 to be moved downwardly by the spring 112 until the tab 110 is supported on the second step 107. In the latter position of the locator 92, the edge portion 99 thereon will engage the tab 54 to interrupt the inward travel of the tone arm at the edge of a 10 inch record. Similarly, when a 12 inch record is dropped to the turntable, it will move the selector arm 40 to the position shown in dotted lines at 40" in FIGURE 1, whereupon the locator 92 will drop downwardly until the end portion thereof is supported on an edge 145 of a tab 144 on lever 114 as shown in FIGURE 11. In the latter position of the locator, the edge portion 100 will be disposed in the plane of the tab 54 to interrupt the inward travel of the tone arm at the edge of a 12 inch record.

Reset mechanism will now be described for properly positioning the locator 92 and selector 40 at the end of a record change cycle. Referring to FIGURES 2, 8, 11 and 13, the pivotally mounted end of the locator 92 is provided with an integral downwardly projecting finger 120 adapted to cooperate with a pusher plate 122 which is fixedly carried on the pull link 88. In addition, a small lever 124 is pivotally supported on the pin 96 immediately alongside the locator finger 120, and the lever 124 has a downwardly projecting finger portion 126 also adapted to cooperate with the pusher plate 122. A wire pull link 128 (see FIGURE 8) has one end eccentrically connected to the lower end portion of the selector 40, and its other end secured to an upper arm portion 130 of the lever 124. The wire link 128 is adapted to oppose the tension spring 118, whereby when the lever 124 is pivoted in a clockwise direction as viewed in FIGURES 2, 8 and 13, the link 128 will be pulled so as to overcome the spring 118 and swing the selector arm 40 to an extreme outer position somewhat beyond the position shown at 40" in FIGURE 1.

The operation of the foregoing mechanism will now be described. It will be assumed that a record on the turntable 22 is being reproduced, in which case the gear 42 will be in its idle position as shown in FIGURE 7 with the pull link 88 and pusher plate 122 in their forward positions as best shown in FIGURES 2 and 13. Accordingly, the pusher plate 122 will be engaged against the downwardly projecting portion 120 on the locator 92 so as to pivot the latter to its raised or inoperative position against the bias of the tension spring 112, whereby the edge portions on the locator will not interfere with the movement of the tab 54 and thus will permit the tone arm to move freely inwardly to reproduce the recording. In addition, the pusher plate 122 will be engaged against the downwardly projecting finger 126 so as to pivot the lever 124 to its clockwise position and thereby exert a pull upon the wire link 128 to rotate the selector member 40 to its extreme outer position.

Upon completion of the playing of a record on the turntable 22, the plate 52 which rotates with the tone arm 26 will be rotated to a position wherein tab 56 thereon will engage one end of a link 141 causing the opposite end of the link to move a pawl 131 (see FIGURE 7) into the path of a projection 49 on the hub 46 (best shown in FIGURE 8) so as to advance the main gear 42 into mesh with the drive pinion 48. In this manner, a record change cycle is automatically initiated at the completion of a record. The gear 42 will thus be rotated in a counterclockwise direction when viewed from above so as to cause the pull link 88 and pusher plate 122 to be moved away from the projecting fingers 120 and 126.

Figure 13:
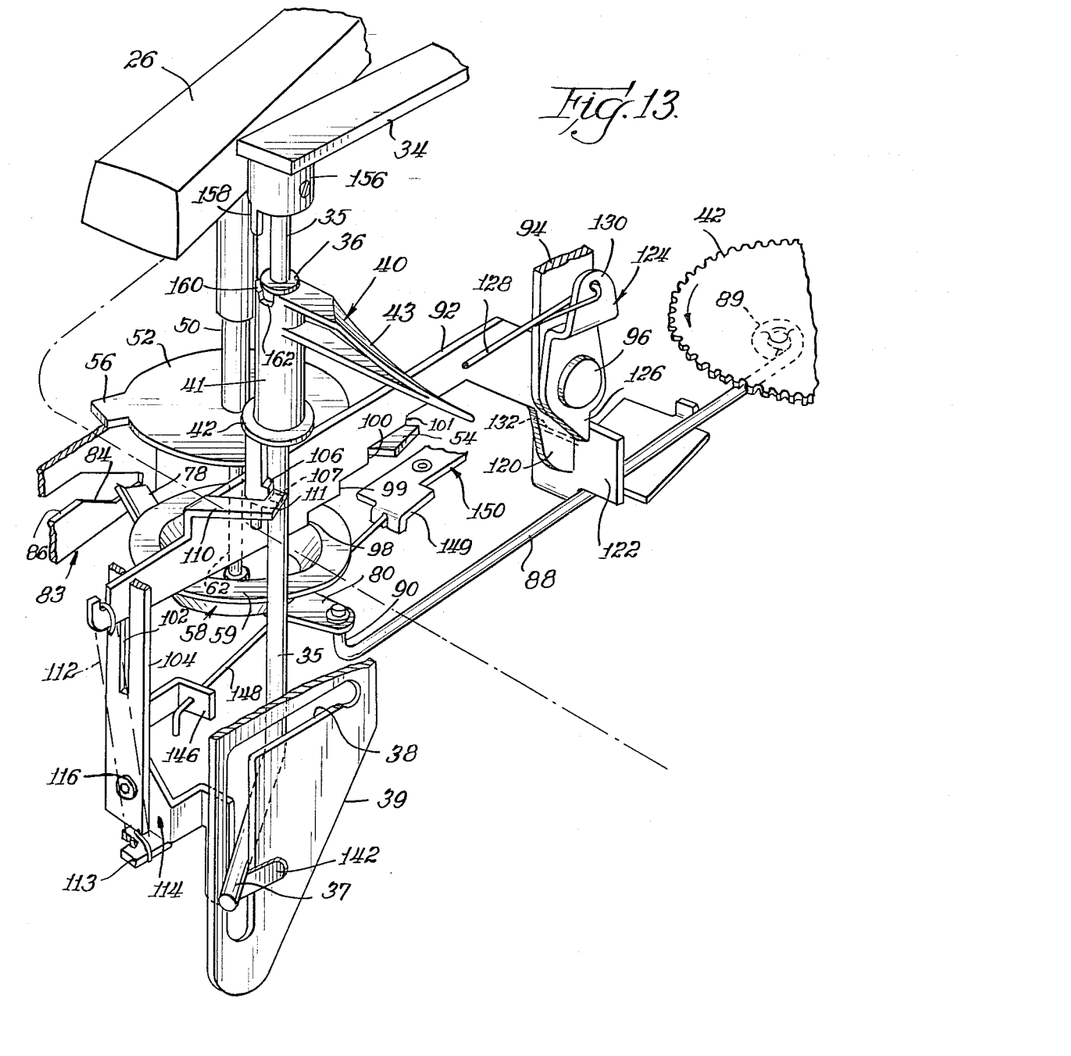
FIGURE 13 is a fragmentary perspective view, somewhat diagrammatic in form, illustrating in particular the tone arm actuating mechanism and selector mechanism of the present invention.

Referring to FIGURE 13, the pusher plate 122 will first be moved laterally a short distance to the right whereby, due to a cutout section 132 along the upper edge of the pusher plate, the shorter finger 126 will slide off the pusher plate prior to release of the finger 120. Thus, as the pusher plate moves away, the lever 124 is released first so as to permit the selector 40 to pivot to its normal inward position as shown in solid lines in FIGURE 1, and thereafter the locator 92 is released and pulled downwardly by the tension spring 112 until the tab 110 thereon comes to rest on the upper step 106 on the selector, whereby the locator is positioned to cause the tone arm to be set down at the edge of a 7 inch record.

As the gear 42 rotates as described above, the pull link 88 through its connection with the clutch lever arm 80 will first rotate the clutch 58 in a clockwise direction (when viewed from below as in FIGURE 2), whereupon the clutch will be moved upwardly to engage the clutch plate 52, and the lift pin 62 will be raised to move the tone arm 26 upwardly away from the record on the turntable. Once the clutch 58 is engaged with the clutch plate 52, further rotation of the clutch in the clockwise direction will cause the tone arm to be swung outwardly clear of any records on the turntable or on the spindle 24, the extreme outer position of the tone arm being determined by engagement between the tab 56 on the clutch plate 52 and the adjacent wall portion of the supporting bracket 83 as shown in FIGURE 7.

When the gear 42 has been rotated approximately one-half revolution, the pin 89 thereon will engage an inclined cam surface on an actuator 134 (see FIGURE 8) and pivot the latter in a counterclockwise direction about a pivot 135 so as to raise a spindle actuator pin 136 and thereby actuate the spindle 24 thus causing a new record to be dropped to the turntable. As the gear 42 begins the second half of its revolution, the pull link 88 will be moved in the opposite direction so as to rotate the clutch 58 in a counterclockwise direction (when viewed from below), whereupon the clutch plate 52 will be similarly rotated causing the tone arm 26 to be swung inwardly over the new record.

If the new record dropped to the turntable is a 7 inch record, then the selector 40 will not be actuated, and the inward travel of the tone arm 26 will be interrupted when the tab 54 engages the edge portion 98 on the locator 92. If a 10 inch record is dropped, the selector 40 will be rotated through a predetermined angle to permit the locator to drop to a lower position, whereby the inward travel of the tone arm will be interrupted when the tab 54 engages the edge portion 99 on the locator. Similarly, if a 12 inch record is dropped to the turntable, the selector 40 will be rotated through a greater predetermined angle to permit the locator to drop to a still lower position, whereby the inward travel of the tone arm will be interrupted when the tab 54 engages the edge portion 100 on the locator.

Once the tab 54 has engaged one of the edge portions on the locator 92 so as to position the tone arm 26 over the edge of the new record on the turntable, further rotation of the clutch 58 causes the clutch lever arm 78 to ride down the cam slope 84 to the position shown in FIGURE 2, whereby the clutch is disengaged from the clutch plate 52 and the lift pin 62 is lowered so as to lower the tone arm to the edge of the new record. When the gear 42 reaches the idle position shown in FIGURE 7, it will stop, having completed one revolution, and at such time the pusher plate 122 will have again moved to the position shown in FIGURES 2 and 13 so as to engage the projecting finger portions 120 and 126 and thereby pivot the selector 40 to its extreme outer position and raise the locator 92 to its extreme upper or inoperative position. It is important to note that the foregoing mechanism is properly timed to assure that the locator 92 is not raised to its inoperative position until the tone arm stylus has had an opportunity to be picked up by a record groove. Consequently, the tone arm is prevented from "skating" or moving inwardly in an uncontrolled manner.

While as previously described the foregoing record change cycle is normally initiated automatically at the end of the playing of a record on the turntable, it will be noted from FIGURE 7 that the on-off-reject control knob 32 is connected through linkage 138, 139, 140 and 141 to the actuating pawl 131. Consequently, whenever the knob 32 is turned to its reject position, the pawl 131 will be actuated to advance the gear 42 into mesh with the drive pinion 48, thus initiating a record change cycle.

When the last record on the spindle 24 has been dropped to the turntable and played, mechanism is provided for automatically shutting off the record changer. Referring to FIGURES 8, 12 and 13, it will be seen that the horizontal lower end portion 37 of the rod 35 on which the record support arm 34 is mounted extends through the slot 38 in the plate 39 so as to surmount a lever arm 142. The arm 142 forms an integral part of the pivotable lever 114, which lever is normally positioned as shown at 114′ in FIGURE 12 by the tension spring 112 (see FIGURE 8). However, it will be understood that when the last record is dropped from the spindle 24, the record support arm 34 is permitted to drop, thus causing the rod portion 37 to engage the lever arm 142 and pivot the lever 114 to a position where lever tip 115 contacts and is blocked by locator 92 until the latter is actuated to its uppermost position at the end of the change cycle, at which time lever 114 will pivot to the inclined position shown at 114″ in FIG. 12.

When the lever 114 is in the position shown at 114′ in FIGURE 12, a tab portion 144 thereon extends beneath the locator 92 to prevent the latter from moving to its extreme lowermost position. However, when the lever 114 is pivoted to the position shown at 114″, the tab 144 is moved clear of the locator 92, whereby when the selector 40 is in its outermost position the locator will drop downwardly so as to position the edge portion 101 in the path of the clutch tab 54. In the latter position, the inward travel of the tone arm 26 will be interrupted while it is positioned over the rest post 28 as shown in solid lines in FIGURE 1.

In addition, referring to FIGURES 7 and 13, the lever 114 has an arm portion 146, and a wire link 148 has one end secured to the arm 146 and its other end secured to an end 149 of a switch actuator arm 150. The actuator 150 is normally positioned clear of the pusher plate 122. However, when the lever 114 is pivoted to the position shown at 114″ in FIGURE 12, the lever 114 acts through the wire link 148 to move the actuator 150 laterally (upwardly as viewed in FIGURE 7) into the path which is followed by the pusher plate 122 when the latter is moving toward the projecting fingers 120 and 126. With the actuator 150 thus positioned, the pusher plate will engage the actuator during the next cycle, and move it approximately to the right as viewed in FIGURE 7.

The actuator 150 is eccentrically connected to a pivotally mounted plate member 152, whereby when the actuator is moved to the right as described above it will rotate the plate member 152 and thereby move a projecting finger 153 thereon into the path of movement of a pin or the like (not shown) carried on the main gear 42. Accordingly, the above-mentioned pin on the gear 42 will engage the finger 153 and effect further rotation of the plate member 152 whereby a tab 154 on the plate member will engage a switch (not shown) and move the latter to "off" position. FIGURE 7 shows the projecting finger 153 in phantom lines in its "on" position, and it will be understood that it is initially moved in a clockwise direction to an intermediate position by the actuator 150, and is thereafter moved further in a clockwise direction to the "off" position shown in solid lines, the latter movement being effected by engagement between the projecting finger 153 and a pin on the gear 42 as above described.

It is important to note that some means must be provided to prevent the foregoing shut-off operation from occurring when the last record is dropped to the turntable, since it is obviously desired to shut off the mechanism only after the playing of the last record has been completed. In the embodiment being described, the desired delay is accomplished due to the manner in which movement of the lever 114 to the position shown at 114″ in FIGURE 12 is initially blocked by the locator 92. Thus, when the last record on the spindle 24 is dropped to the turntable, the rod end portion 37 will engage lever arm 142 and pivot the latter only until the lever tip 115 engages the locator 92. Such movement of the lever 114 will not be sufficient to move the actuator 150 into the path of the pusher plate 122.

At the completion of the last record drop change cycle, the locator 92 will be moved to its uppermost position in the manner previously described, and at this time the lever 114 will be permitted to move to the position shown at 114″. In addition, the selector 40 will be moved to its outermost position at the end of the change cycle as earlier described herein, at which time a downwardly projecting tab 158 (see FIGURE 13) on a record support arm hub portion 156 will drop into a recess 162 formed in an upper edge portion 160 of the selector sleeve 41. In this manner, the selector 40 is locked in its outermost position so as to remain therein during the next cycling of the mechanism.

It will now be understood that upon initiation of another cycle at the completion of the playing of the last record, movement of the pusher plate 122 will permit the locator 92 to move to its lowermost position in the slot 102, since the selector 40 will be held inoperative, whereby the tone arm 26 will be held over the rest post 28 as previously described, and with the lever 114 positioned as at 114″, the actuator 150 will be moved by the pusher plate 122 to effect automatic shut off of the mechanism.

While I have illustrated my invention in a preferred form, I do not intend to be limited to that form, except insofar as the appended claims are so limited, since modifications coming within the scope of my invention will be readily suggested to others with my disclosure before them.

I claim:

1. In a record changer of the type having a tone arm adapted during a record change cycle to be raised to an elevated position and moved first radially outwardly to permit a new record to be dropped to a turntable associated therewith and then radially inwardly to set down on the new record, the improvement comprising, in combination, a first clutch member fixedly associated with said tone arm whereby rotation of said first clutch member in one direction will cause said tone arm to be swung outwardly and rotation of said first clutch member in the opposite direction will cause said tone arm to be swung inwardly, a second rotatable clutch member disposed adjacent said first member and adapted to be moved between an operative position wherein it is in engagement with said first clutch member and an inoperative position wherein said second clutch member is disengaged from said first clutch member, a cam member, a cam follower carried by said second clutch member and adapted to ride on said cam whereby upon rotation of said second clutch member to a first predetermined position said cam will cause said second clutch member to be moved toward said first clutch member to its operative position and upon rotation of said second clutch member to a second predetermined position said cam will permit said second clutch member to be moved to its inoperative position, and drive means comprising an oscillating link connected to said second clutch member for rotating said second clutch member first in one direction and then in the opposite direction during said record change cycle, said cam being operative to maintain second clutch member in engagement with said first clutch member for driving the latter first in said one direction and then in said opposite direction thereby to move said tone arm first outwardly and then inwardly.

2. In a record changer of the type having a tone arm adapted during a record change cycle to be raised to an elevated position and moved first radially outwardly to permit a new record to be dropped to a turntable associated therewith and then radially inwardly to set down on the new record, the improvement comprising, in combination, a first clutch member fixedly associated with said tone arm whereby rotation of said first clutch member in one direction will cause said tone arm to be swung outwardly and rotation of said first clutch member in the opposite direction will cause said tone arm to be swung inwardly, a second rotatable clutch member disposed immediately beneath said first clutch member in approximate axial alignment therewith and adapted to be moved generally vertically between an operative position wherein it is in engagement with said first clutch member and an inoperative position wherein said second clutch member is disengaged from said first clutch member, a cam member, a cam follower carried by said second clutch member and adapted to ride up and down on said cam whereby upon rotation of said second clutch member to a first predetermined position said cam will elevate said second clutch member to its operative position and upon rotation of said second clutch member to a second predetermined position said cam will permit second clutch member to move downwardly to its inoperative position, and drive means comprising an oscillating link connected to said second clutch member for rotating said second clutch member first in one direction and then in the opposite direction during said record change cycle, said cam being operative to maintain said second clutch member in engagement with said first clutch member for driving the latter first in said one direction and then in said opposite direction thereby to move said tone arm first outwardly and then inwardly.

3. The invention of claim 1 wherein said cam follower is relatively flexible whereby if said tone arm is accidentally held against vertical movement said cam follower will bend as it rides up said cam.

4. The invention of claim 1 wherein said cam follower comprises a relatively flexible arm which is fixedly secured to said second clutch member and extends generally radially outwardly therefrom in an approximately horizontal plane with its outer end adapted to ride up and down on said cam.

5. In a record changer of the type having a tone arm adapted during a record change cycle to be raised to an elevated position and moved first radially outwardly to permit a new record to be dropped to a turntable associated therewith and then radially inwardly to set down on the new record, the improvement comprising, in combination, a tone arm, a first clutch member fixedly associated with said tone arm whereby rotation of said first clutch member in one direction will cause said tone arm to be swung outwardly and rotation of said first clutch member in the opposite direction will cause said tone arm to be swung inwardly, a second rotatable clutch member disposed immediately beneath said first clutch member in approximate axial alignment therewith and adapted to be moved generally vertically between an upper operative position wherein it is in engagement with said first clutch member and a lower inoperative position wherein said second clutch member is disengaged from said first clutch member, a cam member, a cam follower carried by said second clutch member and adapted to ride up and down on said cam whereby upon rotation of said second clutch member to a first predetermined position said cam will elevate said second clutch member to its operative position and upon rotation of said second clutch member to a second predetermined position said cam will permit said second clutch member to move downwardly to its inoperative position, lift means having one end associated with said second clutch member and its other end associated with said tone arm whereby whenever said second clutch member is raised to its operative position said tone arm will be elevated, and drive means comprising an oscillating link connected to said second clutch member for rotating said second clutch member first in one direction and then in the opposite direction during said record change cycle, said cam being operative to maintain said second clutch member in engagement with said first clutch member for driving the latter first in said one direction and then in said opposite direction thereby to move said tone arm first outwardly and then inwardly.

6. The invention of claim 5 wherein said lift means comprises a substantially vertical lift pin which is engaged at its lower end with said second clutch member and which projects upwardly therefrom into engagement with said tone arm.

7. In a record changer of the type having a tone arm adapted during a record change cycle to be raised to an elevated position and moved first radially outwardly to permit a new record to be dropped to a turntable associated therewith and then radially inwardly to set down on the new record, the improvement comprising, in combination, a first clutch member fixedly associated with said tone arm whereby rotation of said first clutch member in one direction will cause said tone arm to be swung outwardly and rotation of said first clutch member in the opposite direction will cause said tone arm to be swung inwardly, a second rotatable clutch member disposed adjacent said first member and adapted to be moved between an operative position wherein it is in engagement with said first member and an inoperative position wherein said second clutch member is disengaged from said first clutch member, a cam member, a cam follower carried by said second clutch member and adapted to ride on said cam whereby upon rotation of said second clutch member to a first predetermined position said cam will cause said second clutch member to be moved toward said first clutch member to its operative position and upon rotation of said second clutch member to a second predetermined position said cam will permit said second clutch member to be moved to its inoperative position, a relatively large diameter gear rotatable one revolution during said change cycle, and linkage means having one end eccentrically connected to said gear and its other end eccentrically connected to said second clutch means whereby upon rotation of said gear said linkage means will be reciprocated to rotate said second clutch means first in one direction and then in the opposite direction, said cam being operative to maintain said second clutch member in engagement with said first clutch member for driving the latter first in said one direction and then in said opposite direction thereby to move said tone arm first outwardly and then inwardly.

8. In a record changer of the type having a tone arm adapted during a record change cycle to be raised to an elevated position and moved first radially outwardly to permit a new record to be dropped to a turntable associated therewith and then radially inwardly to set down on the new record, the improvement comprising, in combination, a tone arm, a first clutch member fixedly associated with said tone arm whereby rotation of said first clutch member in one direction will cause said tone arm to be swung outwardly and rotation of said first clutch member in the opposite direction will cause said tone arm to be swung inwardly, a second rotatable clutch member disposed immediately beneath said first clutch member in approximate axial alignment therewith and adapted to be moved generally vertically between an upper operative position wherein it is in engagement with said first clutch member and a lower inoperative position wherein said second clutch member is disengaged from said first clutch member, a cam member, a cam follower carried by said second clutch member and adapted to ride up and down on said cam whereby upon rotation of said second clutch member to a first predetermined position said cam will elevate said second clutch member to its operative position and upon rotation of said second clutch member to a second predetermined position said cam will permit said second clutch member to move downwardly to its inoperative position, lift means having one end associated with said second clutch member and its other end associated with said tone arm whereby whenever said second clutch member is raised to its operative position said tone arm will be elevated, said cam follower member being relatively flexible whereby if said tone arm is accidentally held against vertical movement said cam follower will bend as it rides up said cam, a relatively large diameter gear rotatable one revolution during said change cycle, and linkage means having one end eccentrically connected to said gear and its other end eccentrically connected to said second clutch means whereby upon rotation of said gear said linkage means will be reciprocated to rotate said second clutch means first in one direction and then in the opposite direction, said cam being operative to maintain said second clutch member in engagement with said first clutch member for driving the latter first in said one direction and then in said opposite direction thereby to move said tone arm first outwardly and then inwardly.

9. The invention of claim 8 wherein a clutch actuator lever is secured to said second clutch member, said lever having a first flexible arm which comprises said cam follower and which extends generally radially outwardly from said second clutch member so as to lie in a generally horizontal plane with its end portion adapted to ride up and down on said cam, and said lever having a second arm which extends generally radially outwardly from said second clutch member with the end of said second arm being connected to said linkage means.

10. In a record changer of the type adapted to handle a plurality of intermixed records of various sizes and having a tone arm adapted during a record change cycle to be raised to an elevated position and moved first radially outwardly to permit a new record to be dropped to a turntable associated therewith and then radially inwardly to set down on the new record, the improvement comprising, in combination, a tone arm, a rotatable member fixedly associated with said tone arm for rotation therewith about a generally vertical axis and having projecting means thereon, a locator member pivoted at one end about a generally horizontal axis and having a plurality of horizontally spaced edge portions at different vertical levels thereon whereby depending upon the vertical position of said locator a selected one of said edge portions will engage said projecting means to interrupt rotation of said tone arm as the latter moves inwardly to set down on a record on the turntable, and a selector member rotatable about a generally vertical axis and having a horizontally extending arm adapted to be engaged when records of a predetermined size are dropped to the turntable so as to rotate said selector member an amount dependent upon the size of the record to be played, said selector member having stepped means at its lower end adapted to cooperate with said locator whereby the vertical position of said locator will be determined by the rotational position of said selector thereby causing the tone arm to be set down in a playing position corresponding to the size of a record to be played.

11. The invention of claim 10 wherein said horizontally extending selector arm is provided with an inclined upper surface to permit said arm to be cammed outwardly when engaged by a record which is dropped to the turntable, and wherein means is provided for biasing said selector arm inwardly.

12. The invention of claim 10 wherein said locator has a horizontally projecting tab which is adapted to be supported at varying heights on said stepped means formed at the lower end of said selector whereby the height of said locator is determined by the rotational position of said selector.

13. In a record changer of the type adapted to handle a plurality of intermixed records of various sizes and having a tone arm adapted during a record change cycle to be raised to an elevated position and moved first radially outwardly to permit a new record to be dropped to a turntable associated therewith and then radially inwardly to set down on the new record, the improvement comprising, in combination, a tone arm, a rotatable member fixedly associated with said tone arm for rotation therewith about a generally vertical axis and having projecting means thereon, a stepped locator member pivoted at one end about a generally horizontal axis and having a plurality of steps formed on its underside to provide a plurality of horizontally spaced edge portions at different vertical levels whereby depending upon the vertical position of said locator a selected one of said edge portions will lie in the plane of said projecting means so as to engage said projecting means and interrupt rotation of said tone arm as the latter moves inwardly to set down on a record on the turntable, and a selector member rotatable about a generally vertical axis and having a horizontally extending arm with an upper inclined cam surface adapted to be engaged when records of a predetermined size are dropped to the turntable so as to rotate said selector member an amount dependent upon the size of the record to be played, said selector member having a plurality of steps at its lower end at different vertical levels with said locator being supported on a selected one of said steps depending upon the rotational position of said selector whereby the vertical position of said locator will be determined by the rotational position of said selector thereby causing the tone arm to be set down in a playing position corresponding to the size of a record to be played.

14. The invention of claim 13 wherein the steps formed at the lower end of said selector follow an arcuate path and wherein said locator is provided with a horizontally extending tab normally supported on one of said steps.

15. The invention of claim 14 wherein said locator tab is normally supported on the uppermost one of said steps formed at the lower end of said selector and wherein said locator is biased downwardly whereby upon rotation of said selector due to engagement by a record dropped to the turntable said steps will move in an arcuate path relative to said tab to permit said locator to be moved downwardly an amount dependent upon the degree of rotation of said selector.

16. The invention of claim 13 wherein reset mechanism is provided which is operable approximately at the commencement of the playing of a new record to move said locator to an uppermost inoperative position and to rotate said selector to an extreme outer position.

17. The invention of claim 16 wherein said locator is biased downwardly and said selector is biased inwardly and wherein said reset mechanism is adapted upon the initiation of a record change cycle to first release said selector so as to permit it to rotate inwardly and then to release said locator so as to permit it to move downwardly until supported on the uppermost one of said steps formed on said selector.

18. In a record changer of the type adapted to handle a plurality of intermixed records of various sizes and having a tone arm adapted during a record change cycle to be raised to an elevated position and moved first radially outwardly to permit a new record to be dropped to a turntable associated therewith and then radially inwardly to set down on the new record, the improvement comprising, in combination, a tone arm, a first clutch member fixedly associated with said tone arm whereby rotation of said first clutch member in one direction will cause said tone arm to be swung outwardly and rotation of said first clutch member in the opposite direction will cause said tone arm to be swung inwardly, projecting means on said first clutch member, a second rotatable clutch member disposed adjacent said first clutch member and adapted to be moved between an operative position wherein it is in engagement with said first clutch member and an inoperative position wherein said second clutch member is disengaged from said first clutch member, a cam member, a cam follower carried by said second clutch member and adapted to ride on said cam whereby upon rotation of said second clutch member to a first predetermined position said cam will cause said second clutch member to be moved toward said first clutch member to its operative position and upon rotation of said second clutch member to a second predetermined position said cam will permit said second clutch member to be moved to its inoperative position, drive means for rotating said second clutch member during said record change cycle to swing said tone arm first outwardly and then inwardly to set down on a record on the turntable, a locator member pivoted at one end about a generally horizontal axis and having a plurality of horizontally spaced edge portions at different vertical levels thereon whereby depending upon the vertical position of said locator a selected one of said edge portions will engage said projecting means on said first clutch member to interrupt rotation of said tone arm as the latter moves inwardly to set down on a record, and a selector member rotatable about a generally vertical axis and having a horizontally extending arm with an upper inclined cam surface adapted to be engaged when records of a predetermined size are dropped to the turntable so as to rotate said selector member an amount dependent upon the size of the record, said selector member having stepped means at its lower end adapted to cooperate with said locator whereby the vertical position of said locator will be determined by the rotational position of said selector thereby causing the tone arm to be set down in a playing position corresponding to the size of a record to be played.

19. The invention of claim 18 wherein said second rotatable clutch member is disposed immediately beneath said first clutch member in approximate axial alignment therewith and is adapted to be moved generally vertically by said cam and cam follower means between an upper operative position wherein it is in engagement with said first clutch member and a lower inoperative position wherein said second clutch member is disengaged from said first clutch member, and wherein lift means is provided having one end associated with said second clutch member and its other end associated with said tone arm whereby whenever said second clutch member is raised to its operative position said tone arm will be elevated.

20. The invention of claim 19 including a relatively large diameter gear rotatable one revolution during said change cycle, and linkage means having one end eccentrically connected to said gear and its other end eccentrically connected to said second clutch means whereby upon rotation of said gear said linkage means will be reciproated to rotate said second clutch means first in one direction and then in the opposite direction.

UNITED STATES PATENTS
OTHER REFERENCES 2,752,159  6/1956  Bacher ______________ 274—10
2,930,623  3/1960  Lee ________________ 274—15

FOREIGN PATENTS 588,135  12/1959  Canada.
890,720  9/1953  Germany.

NORTON ANSHER, *Primary Examiner.*